(12) United States Patent
Sun et al.

(10) Patent No.: US 11,059,358 B2
(45) Date of Patent: Jul. 13, 2021

(54) OPEN ROOF ASSEMBLY HAVING A DRIVE ASSEMBLY FOR OPERATING A SUNSHADE MEMBER AND A CLOSURE MEMBER SEQUENTIALLY

(71) Applicant: Inalfa Roof Systems Group B.V., Oostrum (NL)

(72) Inventors: Sunny Sun, Weifang (CN); Hardy Shen, Shanghai (CN); Yi Shi, Shanghai (CN)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 16/785,261

(22) Filed: Feb. 7, 2020

(65) Prior Publication Data

US 2020/0254857 A1    Aug. 13, 2020

(30) Foreign Application Priority Data

Feb. 11, 2019 (CN) .......................... 201910109503.5

(51) Int. Cl.
| | | |
|---|---|---|
| *B60J 3/00* | (2006.01) | |
| *B60J 7/00* | (2006.01) | |
| *B60J 7/043* | (2006.01) | |
| *B60J 7/19* | (2006.01) | |
| *B60J 7/057* | (2006.01) | |

(52) U.S. Cl.
CPC .............. *B60J 7/043* (2013.01); *B60J 7/0573* (2013.01); *B60J 7/192* (2013.01); *B60J 7/057* (2013.01)

(58) Field of Classification Search
CPC ........ B60J 7/0007; B60J 7/0015; B60J 7/003; B60J 7/0023; B60J 7/0038; B60J 7/02; B60J 7/04; B60J 7/041; B60J 7/047; B60J 7/0435; B60J 7/05; B60J 7/053; B60J 7/057; B60J 7/0573
USPC .... 296/214, 216.01–216.05, 216.08, 220.01, 296/221–223
See application file for complete search history.

(56) References Cited

U.S. PATENT DOCUMENTS

| | | | | |
|---|---|---|---|---|
| 5,335,961 | A | * | 8/1994 | Reinsch ................. B60J 7/0023 296/213 |
| 5,507,547 | A | * | 4/1996 | Hattass ..................... B60J 7/003 296/211 |
| 8,226,160 | B2 | * | 7/2012 | Hirai ........................ B60J 7/003 296/214 |
| 8,939,499 | B2 | * | 1/2015 | Heidan .................. B60J 7/0573 296/223 |
| 10,005,343 | B2 | * | 6/2018 | Smith .................... B60J 7/0007 |

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof assembly comprises a drive assembly having a slider member. The slider member comprising a coupling member, a first lever member coupled to a sunshade member and a second lever member coupled to a closure member. Each lever member comprises a mating member for coupling with the slider member and a locking lever for releasably engaging a respective locking recess. The slider member is sequentially couplable to one of the lever members. When the slider member is coupled to the first lever member, the sunshade member may be opened or closed by moving the slider member. When the slider member is coupled to the second lever member, the closure member may be opened or closed by moving the slider member.

10 Claims, 5 Drawing Sheets

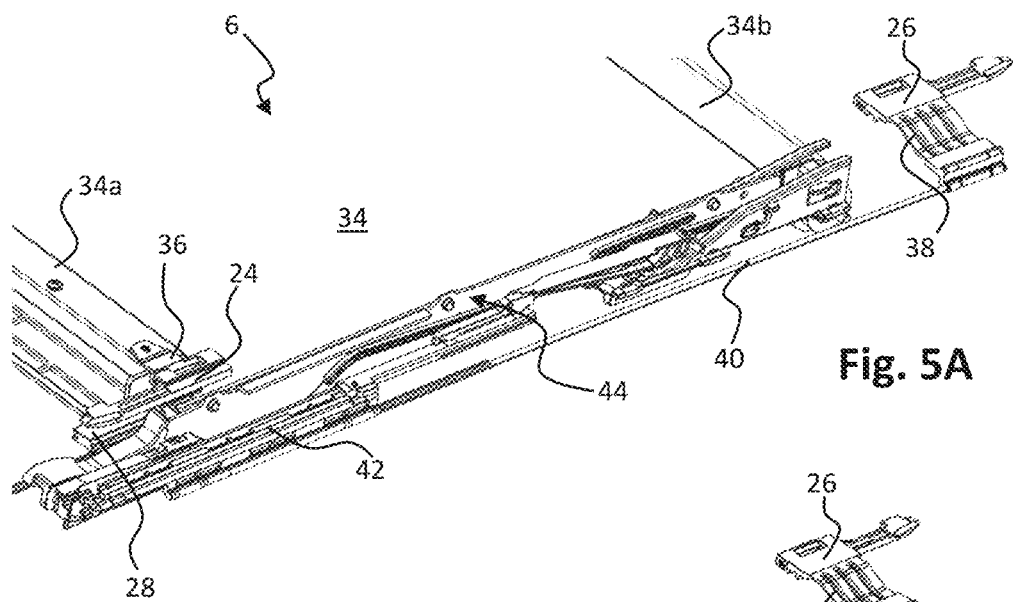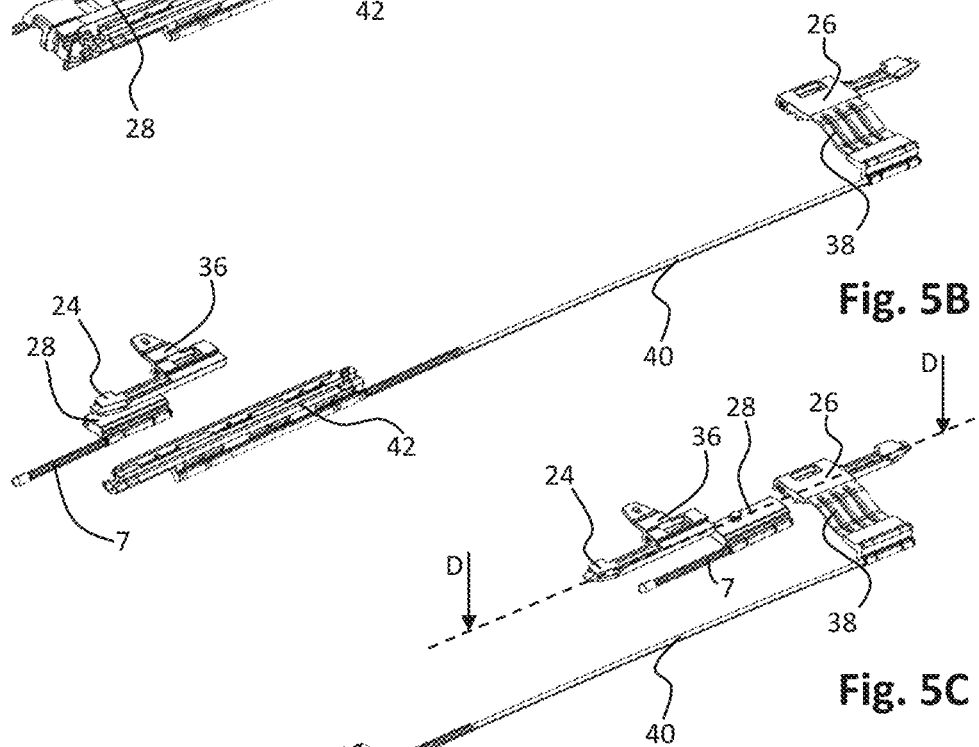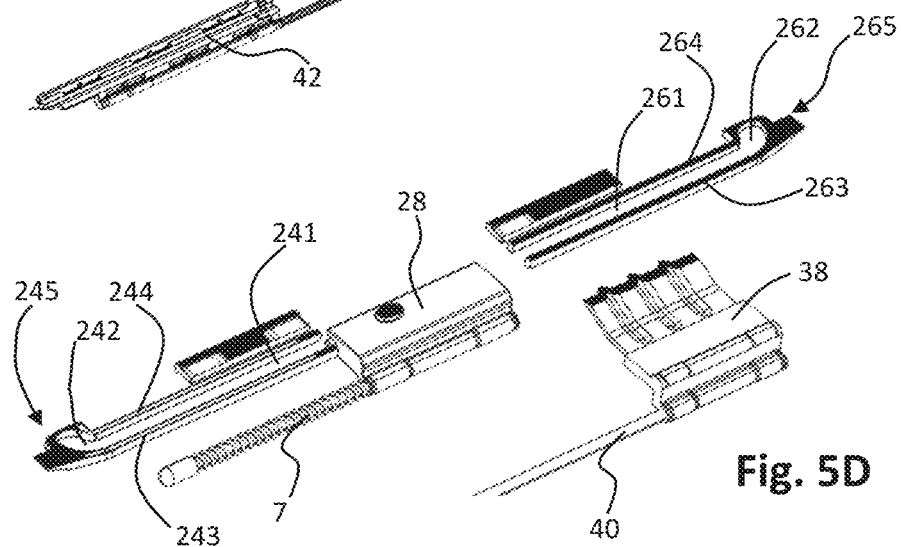

OPEN ROOF ASSEMBLY HAVING A DRIVE ASSEMBLY FOR OPERATING A SUNSHADE MEMBER AND A CLOSURE MEMBER SEQUENTIALLY

BACKGROUND

The discussion below is merely provided for general background information and is not intended to be used as an aid in determining the scope of the claimed subject matter.

The invention relates to an open roof assembly for a vehicle, wherein the open roof assembly includes a sunshade member, a closure member and a single drive motor for operating the closure member and the sunshade member.

An open roof assembly for a vehicle is generally known. The open roof assembly provides a closure member, commonly a transparent panel, that in a closed position closes an opening in the vehicle roof. The closure member may be moved into an open position, thereby at least partly uncovering the opening in the vehicle roof. Further, it is generally known to provide a sunshade member for covering the opening, usually but not necessarily with the closure member in the closed position, to protect against sunlight. Such a sunshade member may be a slideably arranged plate-like member or may be rollo shade, which rollo shade comprises a retractable and flexible sheet of material, e.g. a textile or any other woven or non-woven cloth, that is stored in a retracted position on a roll or any other tubular member.

Both closure member and sunshade member may be electrically operated. For example, it is known to provide for each of said members a dedicated drive motor, that is operatively coupled to the respective member. Then, operating the dedicated drive motor results in moving either the closure member between its closed position and its open position or moving the sunshade member to cover or uncover the opening in the vehicle roof or the closure member.

In order to reduce costs and/or reduce weight, it is known to provide a single drive motor for operating both the closure member and the sunshade member. In such known open roof assembly with a single drive motor, a relatively complex drive assembly is used either in order to separate the operation of the closure member and the sunshade member or in order to provide for selectively operating one or both of the members. The complex drive assembly however increases costs and weight and above all increases an amount of space needed for the drive assembly. In particular, a height of the drive assembly is preferred to be as small as possible to provide for a maximum height available in an interior space of the vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof assembly comprises a moveably arranged closure member for closing an opening, a moveably arranged sunshade member for covering the opening and a drive assembly for sequentially moving the closure member and the sunshade member.

The drive assembly comprises a guide, a slider member, a drive motor, a first lever member and a second lever member. The guide defines a slider track extending between a first track end and a second track end. The slider member is operatively coupled to the guide and the slider member comprising a coupling member. The drive motor is operatively coupled to the slider member for moving the slider member along the slider track between the first track end and the second track end, wherein the slider member is guided by the guide.

The first lever member is coupled to the sunshade member and is moveably arranged along the slider track for operating the sunshade member. The first lever member comprises a first mating member for coupling to the coupling member and a first locking lever for releasably engaging a first locking recess arranged along the slider track. The second lever member is coupled to the closure member and is moveably arranged along the slider track for operating the closure member. Like the first lever member, the second lever member comprises a second mating member for coupling to the coupling member and a second locking lever for releasably engaging a second locking recess arranged along the slider track, wherein the second locking recess is arranged closer to the second track end than the first locking recess.

The slider member is coupled to the first lever member, when the slider member is between the first track end and the first locking recess and the slider member is coupled to the second lever member when the slider member is between the second locking recess and the second track end.

Thus, in the open roof assembly, the single drive motor is configured to move the slider member along a single slider track, wherein in a first part of the slider track extending between the first track end and the first locking recess, the slider member is coupled to the sunshade member and, in a second part of the slider track extending between the second track end and the second locking recess, the slider member is coupled to the closure member.

In an embodiment of the open roof assembly, the guide comprises a guide channel, in which the slider track is arranged, and the slider member is moveably arranged in the guide channel. A guide channel provides for a simple and reliable arrangement for guiding the slider member along the slider track.

In a further embodiment, the first locking lever and the second locking lever are arranged in the guide channel and the guide channel comprises a channel wall, wherein the first locking recess and the second locking recess are provided in said channel wall, thereby providing a simple arrangement for locking either of the first and the second lever members in a position in the guide channel.

In an embodiment of the open roof assembly, the coupling member comprises a cam protruding from a surface of the slider member, while the first mating member comprises a first cam track for receiving the cam and the second mating member comprises a second cam track for receiving the cam. Thus, either of the lever members may be engaged and operated by the slider member by engaging the respective cam tracks with the cam. Of course, in a similar embodiment, the positions of the cam and cam tracks may be mechanically reversed, i.e. the slider member may be provided with a cam track, while the lever members are provided with respective mating cams.

In a particular embodiment, the first cam track extends in the first locking lever, the first cam track having a first curved cam track section, wherein the first curved cam track section is configured to operate the first locking lever to be released from the first locking recess when the cam engages the first curved cam track section. Further, the second cam track extends in the second locking lever, the second cam track having a second curved cam track section, wherein the second curved cam track section is configured to operate the second locking lever to be released from the second locking recess when the cam engages the second curved cam track section. In this embodiment, the cam on the slider member directly acts on the lever, providing a simple and reliable configuration.

In a further particular embodiment, the first locking lever comprises a first resilient section, the first resilient section comprising two parallel arms, the first cam track extending between the two parallel arms. Further, the second locking lever comprises a second resilient section, the second resilient section comprising two parallel arms, the second cam track extending between the two parallel arms. The two parallel arms thus provide for the cam track and also for the bending capability of the lever. Moreover, it is noted that due to the configuration of two parallel arms the lever does not rotate. The two parallel arms, bending due to a force exerted by the cam, bend in parallel, thereby essentially forming a parallelogram. Consequently, an end of the lever translates instead of rotates, although it is noted that due to material properties and configuration a minor rotational movement may still occur.

In an embodiment, the open roof assembly comprises a closure member mechanism for holding and moving the closure member, wherein the closure member mechanism is arranged adjacent to and extends parallel to the slider track. The closure member mechanism comprises a mechanism slider for operating the closure member mechanism. Further, the mechanism slider is coupled to the second lever member. Thus, when the slider member is coupled to the second lever member and the second lever member moves with the slider member, the mechanism slider is moved as well. Consequently, the closure member mechanism is operable by moving the slider member.

In a particular embodiment, the slider track and the closure member mechanism extend in a first direction and a first track part of the slider track extends between the first track end and the first locking recess is at least partly arranged adjacent to the closure member mechanism.

In a further particular embodiment, the slider track and the closure member mechanism extend in a first direction and a second track part of the slider track extends between the second track end and the second locking recess and is shifted in the first direction relative to the closure member mechanism to the extent that the second track part and the closure member do not overlap in the first direction. The slider track is thus separated in the first track part and the second track part. When the slider member is in the first track part, it is normally coupled to the first lever member and operates the sunshade member and when the slider member is in the second track part, it is normally coupled to the second lever member and operates the closure member.

In an even further embodiment, the first track part is arranged adjacent to a first side of the closure member mechanism and wherein the mechanism slider is arranged on a second side of the closure mechanism, the second side being opposite to the first side. An elongated coupling element extends from the mechanism slider in parallel to and on the second side of the closure mechanism to a bridging element, wherein the bridging element couples the elongated coupling element and the second lever member, thereby mechanically coupling the second lever member and the mechanism slider.

BRIEF DESCRIPTION OF THE DRAWINGS

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings, in which:

FIGS. 5A-5D show perspective views of parts of the detailed embodiment illustrated in FIG. 4A.

DETAILED DESCRIPTION OF THE ILLUSTRATIVE EMBODIMENTS

Figure 1A:
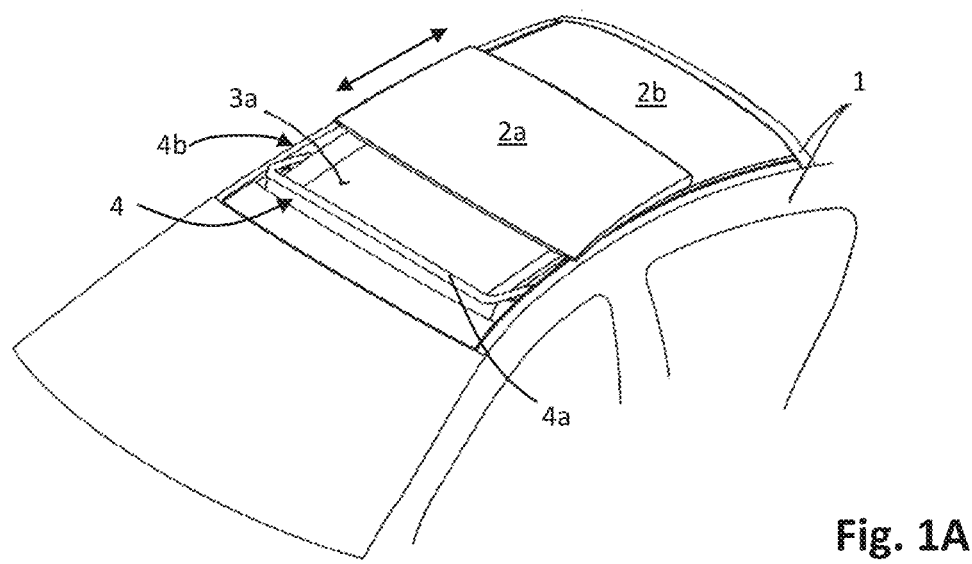
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed. It is noted that in FIG. 1A, the moveable panel 2a is in the open position.

It is noted that the illustrated vehicle roof 1 corresponds to a passenger car. The present invention is however not limited to passenger cars. Any other kind of vehicles that may be provided with a moveable panel are contemplated as well.

Figure 1B:
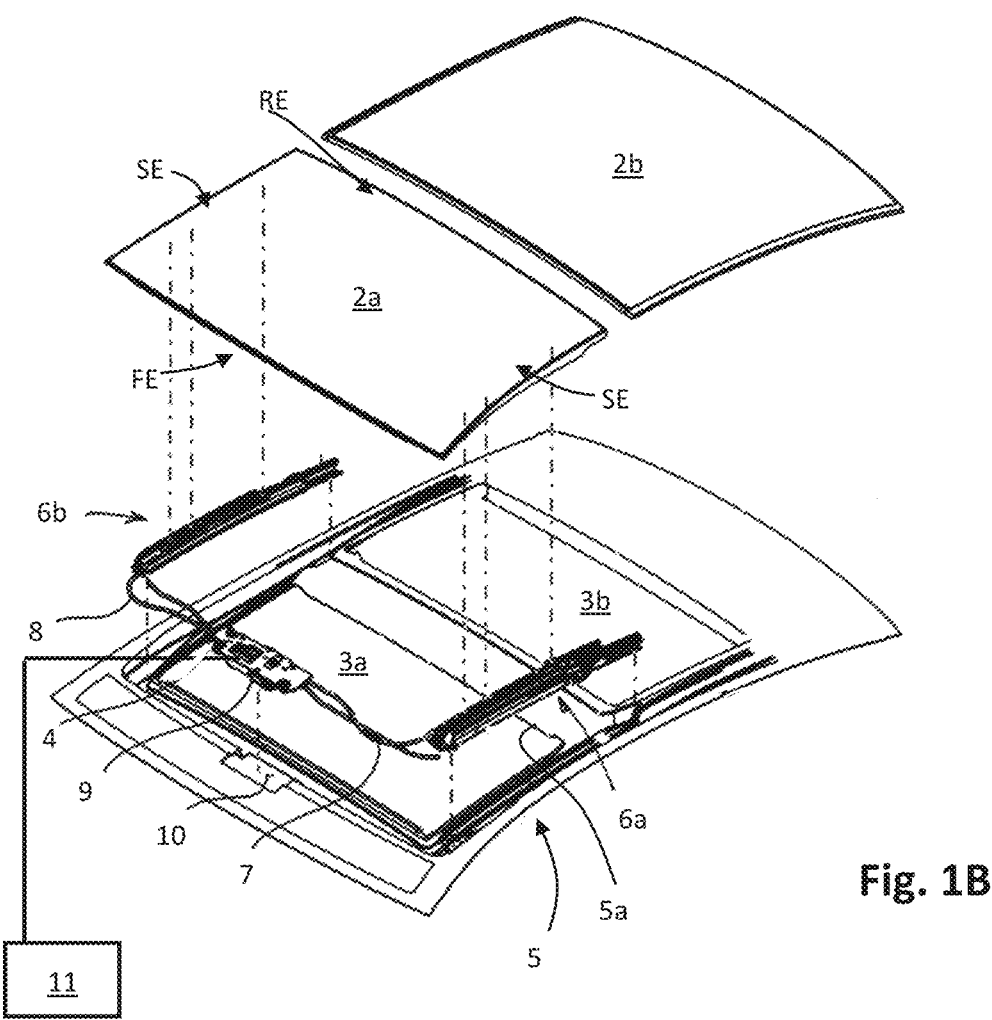
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
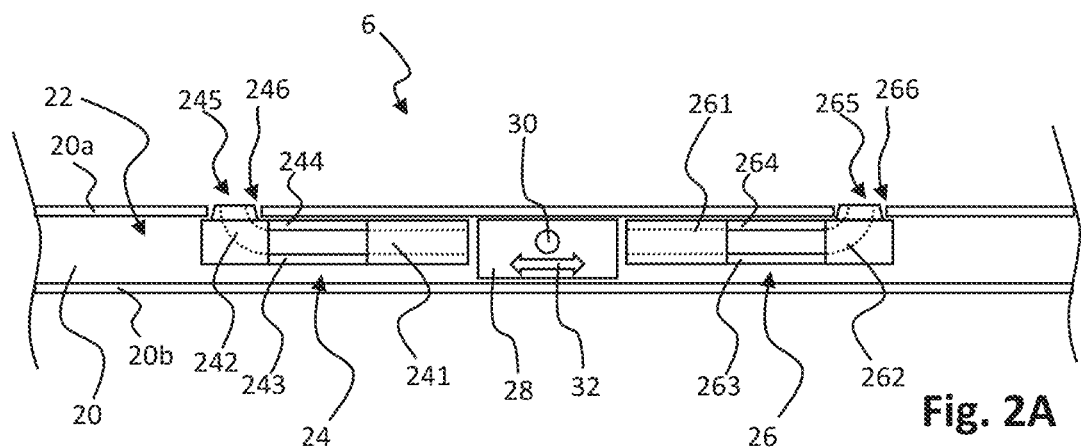
FIGS. 2A-2C illustrate operation of a first part of an embodiment of a drive assembly of an open roof assembly.

FIG. 2A shows a schematical top view of an embodiment of a guide assembly 6 as a part of a drive assembly according to the present invention. The illustrated guide assembly 6 comprises a guide channel 20 having two channel walls 20a, 20b. In the guide channel 20, a slider track 22 is provided for a slider member 28. The slider member 28 is slideably arranged in the guide channel 20 and is enabled to slide in a first direction 32. For example, a drive cable 7 (FIG. 1B) may be coupled between the slider member 28 and an electric motor 9 (FIG. 1B) for moving the slider member 28.

Further, in the guide channel 20, a first lever member 24 and a second lever member 26 are slideably arranged. The first lever member 24 comprises a first cam track 241 with a first curved cam track section 242 and a locking lever 245 having a first lever arm 243 and a second lever arm 244, wherein the first and second lever arms 243, 244 are arranged in parallel. In particular, in this illustrated embodiment, the two parallel arms 243, 244 define and provide for a section of the cam track 241. The two parallel arms 243, 244 may comprise resilient material such that the parallel arms may bend or the parallel arms 243, 244 may be hingedly coupled such that the parallel arms 243, 244 may hinge, as is shown in FIG. 2C and is discussed in more detail hereinbelow. Similarly, the second lever member 26 comprises a second cam track 261 with a second curved cam track section 262, a second locking lever 265 with two parallel arms 263, 264. The first locking lever 245 is locked in a first locking recess 246 in the channel wall 20a and the second locking lever 265 is locked in a second locking recess 266 in the same channel wall 20a.

The slider member 28 comprises a cam 30 configured and arranged to mate with either one of the first cam track 241 and the second cam track 261, when the slider member 28 is moved in the guide channel 20. In the position shown in FIG. 2A, the slider member 28 is arranged between the respective lever members 24, 26 and, accordingly, the cam 30 is not engaged with either of the respective mating cam tracks 241, 261.

Figure 2B:
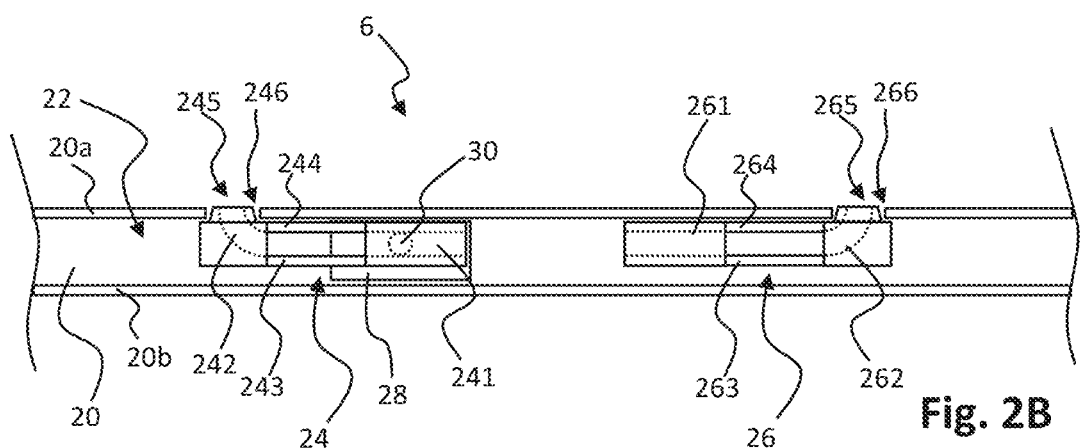
Figure 2C:
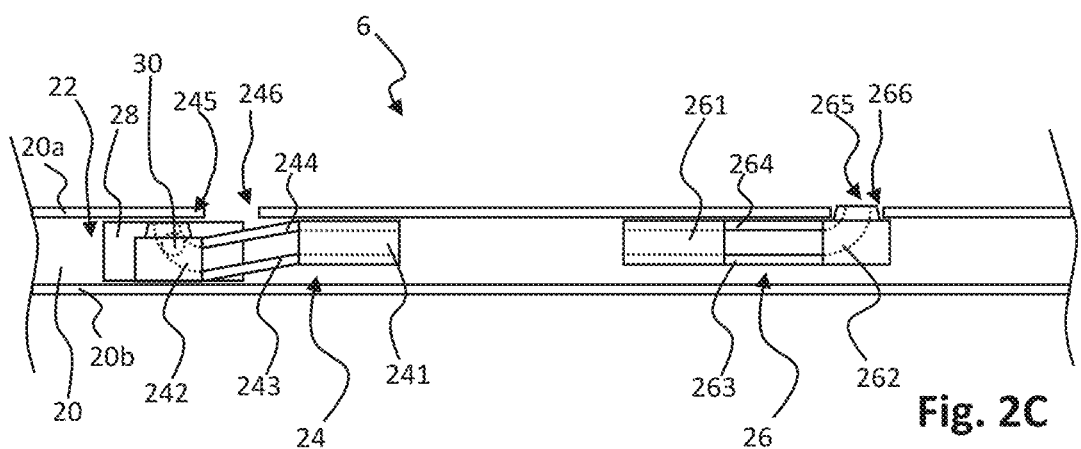

In FIG. 2B, the slider member 28 is moved as compared to the position illustrated in FIG. 2A. The slider member 28 is moved towards and below the first lever member 24. Accordingly, the cam 30 has entered the first cam track 241.

As compared to the position in FIG. 2B, in FIG. 2C, the slider member 28 has moved further and the cam 30 has entered the first curved cam track section 242. Due to the curvature of said track section 242 and the movement of the cam 30, the first locking lever 245 is moved away from the channel wall 20a, out of the first locking recess 246, and the first lever member 24 is operatively coupled to the slider member 28 and moves with the slider member 28.

Moving in the opposite direction, the slider member 28 will disengage the first lever member 24 as soon as the first locking lever 245 is enabled to enter the first locking recess 246 again. Then, moving further, the slider member 28 will engage the second lever member 26 with the cam 30 in the second cam track 261, eventually resulting in releasing the second locking lever 265 from the second locking recess 266 and moving the second lever member 26 along with the slider member 28. Thus, the illustrated drive assembly is enabled to sequentially operate the first lever member 24 or the second lever member 26. Coupling the first lever member 24 and the second lever member 26 to a respective element or mechanism, the respective elements or mechanisms may be sequentially operated, as illustrated in FIGS. 3A-3C.

Figure 3A:
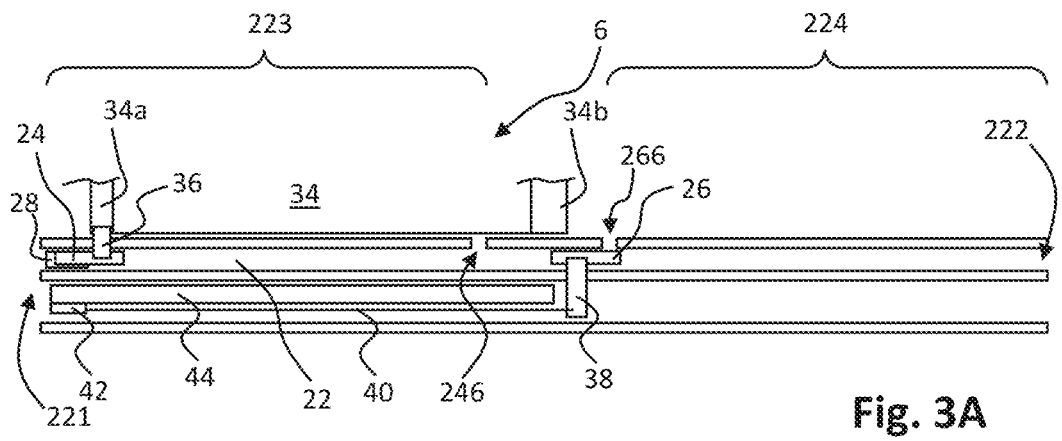
FIGS. 3A-3C illustrate operation of a second part of an embodiment of a drive assembly of an open roof assembly.
Figure 3B:
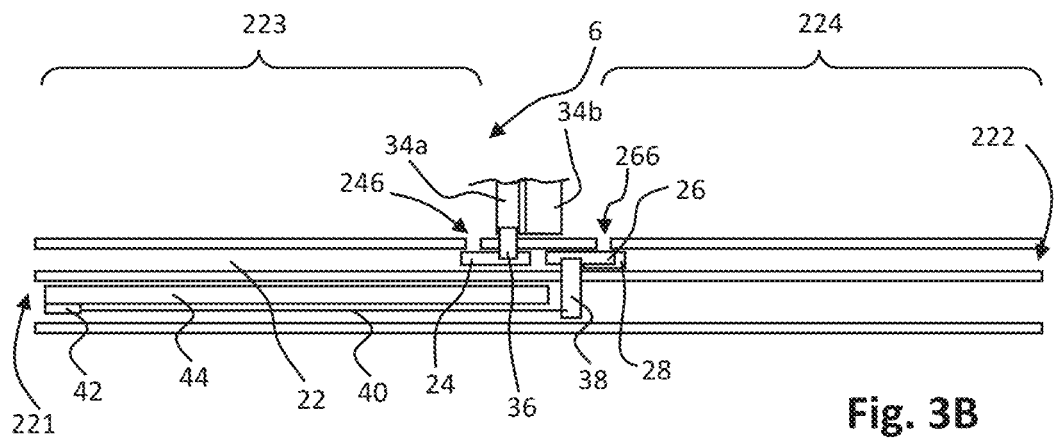
Figure 3C:
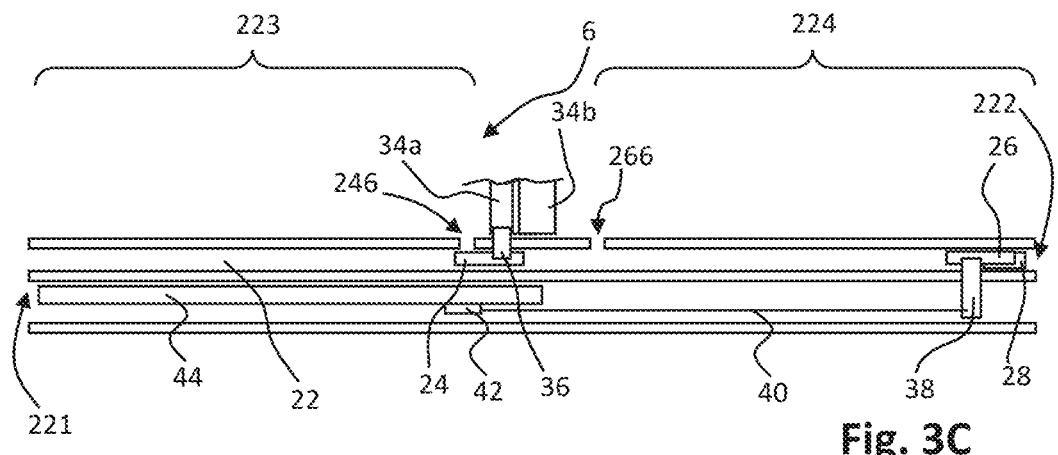

In FIG. 3A, a further embodiment of the guide assembly 6 is shown in a schematical top view. The slider track 22 extends from a first track end 221 to a second track end 222. Thus, the slider track 22 may be divided in a first track part 223 extending between the first track end 221 and the first locking recess 246 and a second track part 224 extending between the second track end 222 and the second locking recess 266.

The first lever member 24 is mechanically coupled to a pull beam 34a of a sunshade cloth 34 through a link 36. In the position illustrated in FIG. 3A, the sunshade cloth 34 is in a closed position and extends from a roll 34b to the pull beam 34a. By moving the pull beam 34a towards the roll 34b, the sunshade cloth 34 is wound on the roll 34b and an opening in the open roof assembly is uncovered, exposing the closure member 2a (FIG. 1B). The closure member 2a is in the closed position, when the sunshade member is in a closed position.

The second lever member 26 is mechanically coupled to a mechanism 44 through a bridging element 38 and an elongated coupling element 40. The mechanism 44 is configured to operate the moveable panel 2a between the closed position and at least one of the tilted position and the open position.

The mechanism 44 is arranged adjacent to and parallel to the first track part 223 and the mechanism 44 comprises a mechanism slider 42. Sliding the mechanism slider 42 along the mechanism 44 operates the mechanism 44, as well known in the art. Hence, in the illustrated embodiment, moving the second lever member 26 along the second track part 224 results in operating the closure member 2a.

In FIG. 3B, in comparison to FIG. 3A, the slider member 28 is moved from the first track end 221 to the second locking recess 266. During the movement, the first lever member 24 is moved to the first locking recess 246, thereby winding the sunshade cloth 34 on the roll 34b. As described in relation to FIG. 2C, at the first locking recess 246, the first locking lever 245 engaged the first locking recess 246. The first lever member 24 disengaged correspondingly from the slider member 28. The slider member 28 thereafter engaged the second lever member 26, releasing the second locking lever 265 from the second locking recess 266. Thus, after opening the sunshade member by moving the pull beam 34a towards the roll 34b, the closure member 2a may be operated by further moving the slider member 28 towards the second track end 222, which is illustrated in FIG. 3C.

In FIG. 3C, the slider member 28 and the second lever member 26 have moved to the second track end 222. Accordingly, the mechanism slider 42 has been pulled along the mechanism 44. Thus, the closure member 2a is moved to its open position, for example.

As apparent from FIGS. 3A-3C and the related description, the drive assembly according to the present invention provides for a sequential operation of the sunshade member and the closure member. Of course, it is apparent to those skilled in the art that a similar drive assembly may be employed for operating different elements.

Figure 4A:
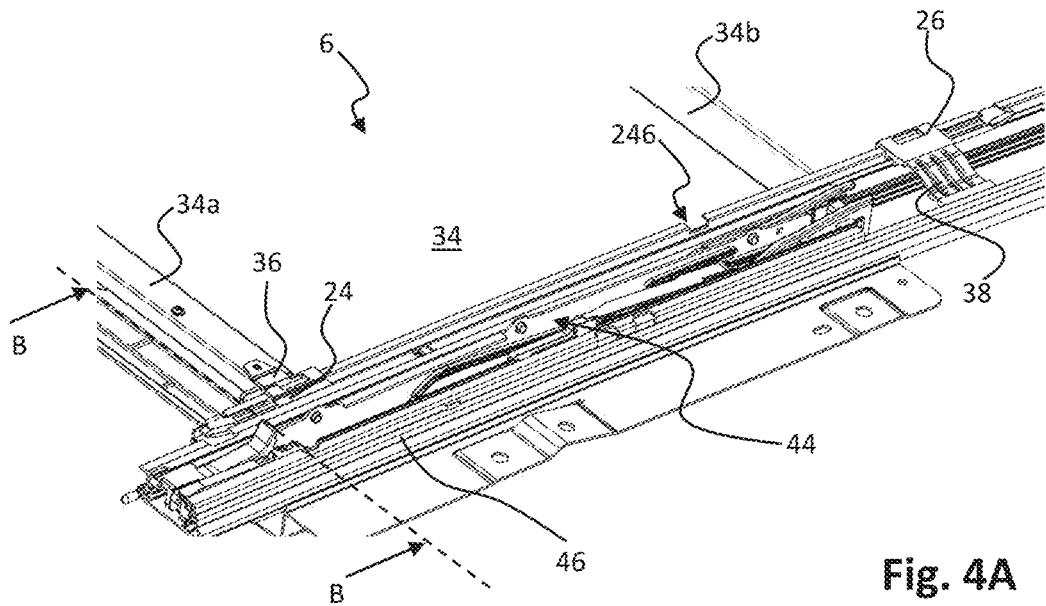
FIG. 4A shows a perspective view of a detailed embodiment of a drive assembly of an open roof assembly.
Figure 4B:
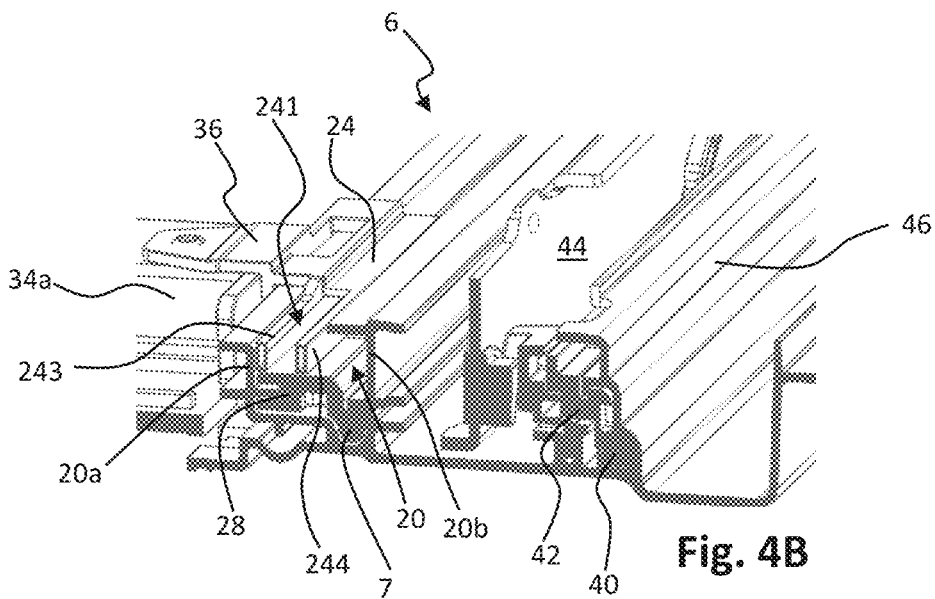
FIG. 4B shows a cross-section of a guide assembly as used in the detailed embodiment of FIG. 4A.

FIG. 4A shows a detailed particular embodiment employing the drive assembly as illustrated in FIGS. 2A-2C and FIGS. 3A-3C. FIG. 4B shows a cross-section of this embodiment according to line B-B indicated in FIG. 4A.

A guide element 46 is provided. The guide element 46 may, for example, be an extruded aluminium or plastic part or may be made of any other suitable material using any other suitable manufacturing method. The guide element 46 provides the guide channel 20 with channel walls 20a, 20b. The first lever member 24 is arranged in the guide channel 20. The first lever member 24 with its first cam track 241 and two parallel arms 243, 244 is arranged over the slider member 28. The slider member 28 is coupled to the drive cable 7. The guide element 46 further provides a separate channel in which the mechanism 44 is arranged having the mechanism slider 42, coupled to the elongated coupling element 40.

FIG. 5A illustrates a part of the embodiment of FIG. 4A. In comparison to FIG. 4A, the guide element 46 has been omitted in the view of FIG. 5A, thereby showing in more detail the configuration and arrangement of guide assembly 6.

In FIGS. 5B and 5C even more elements have been omitted, thereby only showing the lever members 24, 26, the slider member 28 and the elements 38, 40, 42, which elements are used for operating the mechanism. FIG. 5D shows a cross-section along the line D-D through the lever members 24, 26 and the slider member 28 in the positions as shown in FIG. 5C. It is noted that in the FIGS. 5A-5D, the drive cable 7 is shown as a relatively short cable. In practice, of course, this drive cable 7 extends to an electric motor for being pulled or pushed.

In FIG. 5B, the assembly is in the position wherein the sunshade member and the closure member are both in a closed position. In FIG. 5C, the sunshade member is brought into an open position and the slider member 28 has disengaged from the first lever member 24.

In the cross-sectional view of FIG. 5D, the first and second cam tracks 241, 261 are clearly shown. Further, the two parallel arms 243, 244 and 263, 264 defining a section of each of the respective cam tracks 241, 261 is clearly shown.

Operation of this detailed embodiment (FIGS. 4A-5D) corresponds to the operation as elucidated in FIGS. 2A-3C and the description thereof. Therefore, the operation of the detailed embodiment is not further discussed herein.

Thus, a simple and cost-effective assembly for operating a sunshade member and a closure member with a single electric motor is provided. The sunshade member may be operated when the closure member is in a closed state, while the closure member may be operated when the sunshade member is in an open state. This corresponds to common use of an open roof assembly having a sunshade member and a closure member.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open roof assembly comprising a moveably arranged closure member for closing an opening, a moveably arranged sunshade member for covering the opening and a drive assembly for sequentially moving the closure member and the sunshade member, the drive assembly comprising:
    a guide defining a slider track extending between a first track end and a second track end;
    a slider member operatively coupled to the guide, the slider member comprising a coupling member;
    a drive motor operatively coupled to the slider member for moving the slider member along the slider track between the first track end and the second track end and guided by the guide;
    a first lever member coupled to the sunshade member and moveably arranged along the slider track for operating the sunshade member, the first lever member comprising
        a first mating member for coupling to the coupling member and;
        a first locking lever for releasably engaging a first locking recess arranged along the slider track;
    a second lever member coupled to the closure member and moveably arranged along the slider track for operating the closure member, the second lever member comprising
        a second mating member for coupling to the coupling member;
        a second locking lever for releasably engaging a second locking recess arranged along the slider track;
wherein the second locking recess is arranged closer to the second track end than the first locking recess;
wherein the slider member is coupled to the first lever member, when the slider member is between the first track end and the first locking recess; and
wherein the slider member is coupled to the second lever member when the slider member is between the second locking recess and the second track end.

2. The open roof assembly according to claim 1, wherein the guide comprises a guide channel, in which the slider track is arranged, and wherein the slider member is moveably arranged in the guide channel.

3. The open roof assembly according to claim 2, wherein the first locking lever and the second locking lever are arranged in the guide channel and wherein the guide channel comprises a channel wall, the first locking recess and the second locking recess being provided in the channel wall.

4. The open roof assembly according to claim 1, wherein the coupling member comprises a cam protruding from a surface of the slider member;
    wherein the first mating member comprises a first cam track for receiving the cam; and
    wherein the second mating member comprises a second cam track for receiving the cam.

5. The open roof assembly according to claim 4, wherein the first cam track extends in the first locking lever, the first cam track having a first curved cam track section, wherein the first curved cam track section is configured to operate the first locking lever to be released from the first locking recess when the cam engages the first curved cam track section; and
    wherein the second cam track extends in the second locking lever, the second cam track having a second curved cam track section, wherein the second curved cam track section is configured to operate the second locking lever to be released from the second locking recess when the cam engages the second curved cam track section.

6. The open roof assembly according to claim 5, wherein the first locking lever comprises a resilient section, the resilient section comprising two parallel arms, the first cam track extending between the two parallel arms; and
    wherein the second locking lever comprises a resilient section, the resilient section comprising two parallel arms, the second cam track extending between the two parallel arms.

7. The open roof assembly according to claim 1, wherein the open roof assembly comprises a closure member mechanism for holding and moving the closure member, wherein the closure member mechanism is arranged adjacent to and extends parallel to the slider track, the closure member mechanism comprising a mechanism slider for operating the closure member mechanism; and
    wherein the mechanism slider is coupled to the second lever member.

8. The open roof assembly according to claim 7, wherein the slider track and the closure member mechanism extend in a first direction and wherein a first track part of the slider track extending between the first track end and the first locking recess is at least partly arranged adjacent to the closure member mechanism.

9. The open roof assembly according to claim 8, wherein wherein a second track part of the slider track extending between the second track end and the second locking recess is shifted in the first direction relative to the closure member mechanism to the extent that the second track part and the closure member mechanism do not overlap in the first direction.

10. The open roof assembly according to claim 9, wherein the slider track is arranged adjacent to a first side of the closure member mechanism and wherein the mechanism slider is arranged on a second side of the closure member mechanism, the second side being opposite to the first side, and wherein an elongated coupling element extends from the mechanism slider in parallel to and on the second side of the closure member mechanism to a bridging element and wherein the bridging element couples the elongated coupling element and the second lever member.

* * * * *